United States Patent
Wan et al.

(10) Patent No.: US 11,410,641 B2
(45) Date of Patent: Aug. 9, 2022

(54) TRAINING AND/OR USING A LANGUAGE SELECTION MODEL FOR AUTOMATICALLY DETERMINING LANGUAGE FOR SPEECH RECOGNITION OF SPOKEN UTTERANCE

(71) Applicant: Google LLC, Mountain View, CA (US)

(72) Inventors: Li Wan, New York, NY (US); Yang Yu, Mountain View, CA (US); Prashant Sridhar, New York, NY (US); Ignacio Lopez Moreno, New York, NY (US); Quan Wang, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 105 days.

(21) Appl. No.: 16/959,037

(22) PCT Filed: Nov. 27, 2019

(86) PCT No.: PCT/US2019/063643
§ 371 (c)(1),
(2) Date: Jun. 29, 2020

(87) PCT Pub. No.: WO2020/113031
PCT Pub. Date: Jun. 4, 2020

(65) Prior Publication Data
US 2020/0335083 A1 Oct. 22, 2020

Related U.S. Application Data

(60) Provisional application No. 62/772,922, filed on Nov. 29, 2018, provisional application No. 62/772,514, filed on Nov. 28, 2018.

(51) Int. Cl.
G10L 15/00 (2013.01)

(52) U.S. Cl.
CPC .................. *G10L 15/005* (2013.01)

(58) Field of Classification Search
CPC ...... G10L 15/005; G06N 3/088; G06N 20/10; G06N 3/0445; G06N 3/084
(Continued)

(56) References Cited

U.S. PATENT DOCUMENTS 6,049,767 A * 4/2000 Printz .................. G10L 15/063
704/243
6,092,038 A * 7/2000 Kanevsky ............... H03M 7/30
704/9

(Continued)

OTHER PUBLICATIONS

Snyder, D. et al.; "Spoken Language Recognition Using X-vectors;" Odyssey 2018 The Speaker and Language Recognition Workshop; Jun. 26-29, 2018; pp. 105-111; Jun. 26, 2018.

(Continued)

*Primary Examiner* — Thuykhanh Le
(74) *Attorney, Agent, or Firm* — Middleton Reutlinger

(57) ABSTRACT

Methods and systems for training and/or using a language selection model for use in determining a particular language of a spoken utterance captured in audio data. Features of the audio data can be processed using the trained language selection model to generate a predicted probability for each of N different languages, and a particular language selected based on the generated probabilities. Speech recognition results for the particular language can be utilized responsive to selecting the particular language of the spoken utterance. Many implementations are directed to training the language selection model utilizing tuple losses in lieu of traditional cross-entropy losses. Training the language selection model utilizing the tuple losses can result in more efficient training and/or can result in a more accurate and/or robust model—thereby mitigating erroneous language selections for spoken utterances.

17 Claims, 6 Drawing Sheets

(58) Field of Classification Search
USPC .......................................................... 704/231
See application file for complete search history.

(56) References Cited

U.S. PATENT DOCUMENTS

| | | | | |
|---|---|---|---|---|
| 6,484,136 B1* | 11/2002 | Kanevsky | ............... | G06F 40/40 704/255 |
| 6,778,952 B2* | 8/2004 | Bellegarda | ............ | G06F 40/216 704/E15.024 |
| 7,003,460 B1* | 2/2006 | Bub | ..................... | G10L 15/065 704/E15.013 |
| 7,324,927 B2* | 1/2008 | Weng | ................... | G06F 40/216 703/2 |
| 9,110,880 B1* | 8/2015 | Strope | ................... | G10L 15/183 |
| 2001/0051868 A1* | 12/2001 | Witschel | ............... | G10L 15/197 704/10 |
| 2004/0122656 A1* | 6/2004 | Abir | ...................... | G06N 5/022 704/4 |
| 2004/0138883 A1* | 7/2004 | Ramakrishnan | ...... | G10L 15/285 704/E15.048 |
| 2004/0138884 A1* | 7/2004 | Whittaker | ............. | G10L 15/197 704/E15.023 |
| 2005/0143972 A1* | 6/2005 | Gopalakrishnan | .... | G10L 15/197 704/10 |
| 2006/0155538 A1* | 7/2006 | Higgins | ................. | G09B 19/06 704/246 |
| 2006/0178869 A1* | 8/2006 | Acero | ................... | G06F 40/216 704/10 |
| 2006/0212288 A1* | 9/2006 | Sethy | ........................ | G10L 15/18 704/10 |
| 2007/0078653 A1* | 4/2007 | Olsen | ................... | G10L 15/197 704/240 |
| 2007/0100624 A1* | 5/2007 | Weng | ................... | G06F 40/295 704/E15.023 |
| 2007/0150257 A1* | 6/2007 | Cancedda | ............... | G06F 40/45 704/2 |
| 2007/0198266 A1* | 8/2007 | Li | .......................... | G10L 15/08 704/255 |
| 2008/0147579 A1* | 6/2008 | Gao | ...................... | G10L 15/197 706/25 |
| 2008/0177547 A1* | 7/2008 | Yaman | ................ | G10L 15/1815 704/E15.044 |
| 2008/0181489 A1* | 7/2008 | Fu | ........................ | G06K 9/6217 704/E15.028 |
| 2009/0112595 A1* | 4/2009 | Ljolje | .................. | G10L 15/144 704/256.2 |
| 2009/0112599 A1* | 4/2009 | Ljolje | .................. | G10L 15/222 704/E15.001 |
| 2010/0063796 A1* | 3/2010 | Rehberg | .................. | G06F 40/30 704/9 |
| 2010/0256977 A1* | 10/2010 | Yu | ......................... | G06K 9/6277 704/E15.001 |
| 2011/0202334 A1* | 8/2011 | Abir | ........................ | G06F 40/55 704/4 |
| 2011/0231423 A1* | 9/2011 | Lopiano | .............. | G06F 16/2452 707/E17.073 |
| 2012/0072215 A1* | 3/2012 | Yu | ......................... | G06K 9/6296 704/240 |
| 2012/0290293 A1* | 11/2012 | Hakkani-Tur | ........ | G06F 16/951 704/9 |
| 2013/0018650 A1* | 1/2013 | Moore | .................... | G06F 40/44 704/9 |
| 2013/0185057 A1* | 7/2013 | Yoon | ...................... | G09B 19/06 704/9 |
| 2013/0238336 A1* | 9/2013 | Sung | ....................... | G10L 15/32 704/255 |
| 2014/0035823 A1* | 2/2014 | Khoe | ................... | G06F 3/04886 345/171 |
| 2014/0100845 A1* | 4/2014 | Hoskinson | ........... | G06F 40/126 704/8 |
| 2014/0244261 A1* | 8/2014 | Arisoy | .................... | G10L 15/18 704/257 |
| 2015/0269934 A1* | 9/2015 | Biadsy | .................. | G10L 15/197 704/235 |
| 2015/0278194 A1* | 10/2015 | Terao | .................... | G06F 40/284 704/9 |
| 2015/0340034 A1* | 11/2015 | Schalkwyk | ........... | G10L 15/187 704/235 |
| 2015/0348541 A1* | 12/2015 | Epstein | ................. | G10L 15/183 704/257 |
| 2017/0011734 A1* | 1/2017 | Ganapathy | ............ | G10L 15/005 |
| 2017/0193387 A1* | 7/2017 | Lavallee | ................. | G06F 40/40 |
| 2017/0221474 A1* | 8/2017 | Hori | ...................... | G10L 15/063 |
| 2017/0364509 A1* | 12/2017 | Cordell | ................... | G06F 40/58 |
| 2018/0061439 A1* | 3/2018 | Diamos | ................ | G10L 15/24 |
| 2018/0068661 A1* | 3/2018 | Printz | ..................... | G10L 15/19 |
| 2018/0165273 A1* | 6/2018 | Nir | .......................... | G06F 8/425 |
| 2018/0286412 A1* | 10/2018 | Amsterdam | .......... | G06F 40/263 |
| 2018/0315420 A1* | 11/2018 | Ash | ......................... | G10L 25/87 |
| 2018/0342239 A1* | 11/2018 | Baughman | ............ | G10L 15/005 |
| 2018/0357998 A1* | 12/2018 | Georges | ................. | G10L 15/14 |
| 2018/0366110 A1* | 12/2018 | Hashem | .................. | G10L 15/32 |
| 2019/0043475 A1* | 2/2019 | Lewis | .................... | G06F 40/205 |
| 2019/0065458 A1* | 2/2019 | Brunet | ................... | G06Q 50/01 |
| 2019/0103092 A1* | 4/2019 | Rusak | ................... | G06N 3/0454 |
| 2019/0130902 A1* | 5/2019 | Itoh | ......................... | G10L 15/02 |
| 2019/0147851 A1* | 5/2019 | Kizuki | .................... | G10L 15/22 704/251 |
| 2019/0197430 A1* | 6/2019 | Arditi | .................... | G16H 50/20 |
| 2019/0244604 A1* | 8/2019 | Masataki | .............. | G10L 15/063 |
| 2020/0020319 A1* | 1/2020 | Malhotra | ................ | G10L 15/26 |
| 2020/0143114 A1* | 5/2020 | Dua | ....................... | G06F 9/453 |
| 2020/0202846 A1* | 6/2020 | Bapna | ................ | G10L 15/1815 |
| 2020/0320984 A1* | 10/2020 | Kuczmarski | ........... | G06F 40/58 |
| 2021/0144251 A1* | 5/2021 | Chen | ................. | G06F 16/90332 |
| 2021/0233517 A1* | 7/2021 | Gong | ................... | G10L 15/005 |

OTHER PUBLICATIONS

Lopez-Moreno, I. et al.; "Automatic Language Identification Using Deep Neural Networks;" 2014 IEEE International Conference on Acoustics, Speech and Signal Processing (ICASSP); pp. 5337-5341; May 4, 2014.
Wan, L. et al.; "Tuplemax Loss for Language Identification;" Cornell University; arxiv.org; arxiv:1811.12290v1; Nov. 29, 2018.
European Patent Office; International Search Report and Written Opinion of PCT Application No. PCT/US2019/063643; 11 pages; dated Apr. 6, 2020.
Intellectual Property India; Examination Report issued in Application No. 202027053614; 7 pages; dated Dec. 15, 2021.
European Patent Office; Communication Pursuant to Article 94(3) issued in Application No. 19828380.6, 3 pages, dated Dec. 8, 2021.

* cited by examiner

TRAINING AND/OR USING A LANGUAGE SELECTION MODEL FOR AUTOMATICALLY DETERMINING LANGUAGE FOR SPEECH RECOGNITION OF SPOKEN UTTERANCE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that utilizes a speech recognition model to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

However, many speech recognition engines are configured to recognize speech in only a single language. For multilingual users and/or households, such single language speech recognition engines can be unsatisfactory, and can cause an automated assistant to fail and/or provide erroneous output when a spoken utterance is received in an additional language that is not the single language supported by the speech recognition engines. This can render the automated assistant unusable and/or lead to excess usage of computational and/or network resources. Excess usage of computational and/or network resources can be a result of a user needing to provide a further spoken utterance, that is in the single language supported, when the automated assistant fails or provides erroneous output. Such further spoken utterance must additionally be processed by a corresponding client device and/or remote automated assistant component(s), thereby causing additional usage of various resources.

Other speech recognition engines may be configured to recognize speech in multiple languages, but require a user to explicitly designate which of the multiple languages should be utilized in speech recognition at a given time. For example, some of the other speech recognition engines may require a user to manually designate a default language to be utilized in speech recognition of all spoken utterances received at a particular client device. To change the default language to another language, the user can be required to interact with a graphical and/or audible interface to explicitly alter the default language. Such interaction can lead to excess usage of computational and/or network resources in the rendering of the interface, the processing of inputs of the user provided via the interface, etc. Further, it may often be the case that a user forgets to change the default language prior to providing a spoken utterance that is not currently the default language. This can render the automated assistant unusable and/or lead to excess usage of computational and/or network resources as described above.

SUMMARY

Implementations described herein relate to systems, methods, and apparatus for training and/or using a language selection model (which is a neural network model or other machine learning model) for automatically determining a particular language of a spoken utterance captured in audio data. Features of the audio data can be processed using the trained language selection model to generate a predicted probability for each of N different languages, and a particular language selected based on the generated probabilities. Speech recognition results for the particular language can be utilized responsive to selecting the particular language. Many implementations are directed to training the language selection model utilizing tuple losses in lieu of traditional cross-entropy losses. Training the language selection model utilizing the tuple losses can result in more efficient training, thereby resulting in less resources being utilized during training (e.g., processor and/or memory resources utilized in processing training examples during training). Training the language selection model utilizing the tuple losses can additionally or alternatively result in a more accurate and/or robust model—thereby mitigating erroneous language selections for spoken utterances.

As described herein, multiple speech recognition models can be accessible for speech recognition, and each of the speech recognition models can be configured for a corresponding language of N supported speech recognition languages. For example, a first speech recognition model can be configured for use in generating English text based on processing audio data including English spoken utterances, a second speech recognition model can be configured for use in generating French text based on processing audio data including French spoken utterances, a third speech recognition model can be configured for use in generating Spanish text based on processing audio data including Spanish spoken utterances, etc. As described above, a particular language of a spoken utterance can be selected based at least in part on processing, using a trained language selection model, of audio data that captures at least part of the spoken utterance. Further, speech recognition results for the particular language can be utilized responsive to selecting the particular language. For example, speech recognition can be performed utilizing only the speech recognition model that conforms to the particular language, or speech recognition can be performed utilizing multiple speech recognition models, and the speech recognition results generated using a particular one of the models utilized based on it conforming to the particular language.

Various implementations disclosed herein leverage the observation that most multilingual users can only speak a limited number of languages, from a set of supported speech recognition languages N. Those implementations can identify two or more candidate languages, M, for given audio data that captures a spoken utterance, and select a particular language for the spoken utterance based on comparing only generated probabilities for the M candidate languages. In other words, while the trained language selection model is utilized to process at least part of the audio data and generate probabilities for N separate languages, the selection of a particular language can be based on the probabilities for the M languages, which is a subset of the N supported speech recognition languages. As described in more detail herein, the tuple loss utilized in training the language selection model is also utilized with the above observation in mind. Further, a language selection model trained utilizing tuple losses, in lieu of only cross-entropy losses, can result in generation of probabilities for the N supported speech recognition languages that are more likely to lead to selection of a correct language when only M of those languages are considered.

In implementations where only M languages for given audio data are considered, the M languages can be based on, for example, an indication of the M languages provided in a transmission with the audio data (e.g., an indication of the M languages transmitted by a client device with the audio data), based on the M languages being stored in association with a user profile or other identifier associated with the audio data, and/or based on the M languages being stored in association with a client device that generated the audio data. Languages for a user profile and/or a device can be, for example, manually assigned by the user and/or automatically assigned based on past usage of the language(s) by the user (e.g., across one or more platforms), past usage of the language(s) at the client device, etc.

In some implementations, the language selection model can be a discriminative N-class classifier, a long short-term memory ("LSTM") network, or other neural network model. Other types of models, such as support vector machine (SVM) models may be used. In some implementations where SVM models are utilized tuple losses can be applied with linear kernel, since linear kernel is solved with a gradient descent algorithm on primal form. Further, the language selection model is trained using supervised or unsupervised learning, and utilizing the tuple losses described herein. For the sake of brevity, many implementations of training the language selection model that are described herein are described with respect to supervised learning.

As one particular example of training a language selection model based on tuple losses, training examples can be generated for each language of the set of supported speech recognition languages N. Each training example can include: training example input of one or more features of audio data corresponding to a given training spoken utterance; and training example output of a labeled probability metric for each language of the set of total possible languages N. For example, for each training example, there can be a positive probability metric (e.g., "1" and/or other indications of a positive probability metric) for a particular language from the set of supported speech recognition languages N, and a negative probability metric (e.g., "0" and/or other indications of a negative probability metric) for every other language from the set of total possible languages, N. The language selection model can be trained based on the training examples, with tuple losses being generated based on the training examples, and the tuple losses being utilized to update weights of the language selection model (e.g., through backpropagation).

Each tuple loss can be generated as a function of one or more individual tuple losses that are each for a corresponding tuple size that is less than N (the number of probabilities predicted by the language selection model). For example, the tuple loss for a given training example can be generated based at least in part on a pair-wise loss, where the pair-wise loss is for a tuple size of two, and is generated based on comparing the predicted probabilities for all pairs of the N probabilities (where the predicted probabilities are generated by processing the training example input of the given training example using the language selection model), to the labeled probabilities of the labeled probability metric for all pairs as indicated by the training example output.

In some implementations, the pair-wise loss (L(y, z)) can be represented by the following Equation 1:

$$L(y, z) = -E_{k \neq y}\left[\log \frac{\exp(z_y)}{\exp(z_y) + \exp(z_k)}\right] \quad \text{(Equation 1)}$$
$$= E_{k \neq y}[\log(\exp(z_y) + \exp(z_k))] - z_y$$

where $z_k$ is the predicted unnormalized probability of the $k^{th}$ language (of the N languages), where $E_s$ denotes the expectation of a set, s. A subset $S_y^n$ may be a collection of all the tuples that include the correct label y with n elements, where $1 < n \leq N$, where the number of tuples in the subset $S_y^n$ may correspond to the M languages. As appreciated from the above description, the pair-wise loss, unlike cross-entropy loss, does not maximize the probability of the correct label while minimizing the probability of all others equally. Rather, the minimizing of the probability for all other (incorrect) labels is not equal utilizing the pair-wise loss. Again, this can be beneficial in the language selection situation in view of the observation that most multilingual users can only speak a limited number of languages, from a set of supported speech recognition languages N—and in view of only a subset of languages being considered at inference time after training of the model utilizing pair-wise loss (and optionally other individual tuple losses).

Although a pair-wise loss is described above, in various implementations the tuple loss is further a function of additional individual tuple losses. For example, the tuple loss for a given training example can be further generated based at least in part on a tri-wise loss (for a tuple size of three), based at least in part on a four-wise loss (for a tuple size of four), etc. In some implementations, the pair-wise loss of the above Equation 1 can be generalized as the below Equation 2 for determining a loss for producing a label from a subset of n labels:

$$L^n(y, z) = E_{S_y^n}\left[\log \Sigma_{k \in S_y^n} \exp(z_k)\right] - z_y \quad \text{(Equation 2)}$$

where $S_y^n$ is all the tuples in $S_y$ with size n. Accordingly, there are $$\|S^n\| = \binom{N-1}{n-1}$$

combinations of tuples in $S_y^n$. For example, if N=50 different spoken languages and n=2 for pair-wise loss, then the language selection model may determine an individual tuple loss for each of the combination of tuples in $S_y^n$, or for 1,176 tuples. As another example, if N=50 different spoken languages and n=3 for tri-wise loss, then the language selection model may determine an individual tuple loss for each of the combination of tuples in $S_y^n$, or for 18,424 tuples.

Based on the immediately preceding Equation 2, a total tuple loss L(y, z) can be determined as a weighted sum of all individual tuple losses of different sizes for all 1<n≤N based on predicted probabilities for each language. In some implementations, the weighted sum of all the individual tuple losses can be defined by the following Equation 3:

$$L(y,z)=E_{S^n_{-D}}[L^n(y,z)]=\Sigma_{n=2}^N p_n L^n(y,z) \quad \text{(Equation 3)}$$

where $p_n$ is a probability of tuples of size n and $L^n(y, z)$ is a loss associated with $p_n$. The probability of tuples of size n, $p_n$, can corresponds to a percentage of multilingual users, devices, and/or requests that are associated with a quantity of languages of size n. For example, if 90% of multilingual users specify only two pre-defined languages, then $p_2$ may be 0.9. As another example, if 7% of users specify three pre-defined languages, then $p_3$ may be 0.07. Accordingly, $p_n$ effectively biases the total tuple loss toward individual tuple losses that are for tuple sizes that are more likely to occur (e.g., pair-wise losses biased most heavily, followed by tri-wise losses, etc.). As appreciated by the above, in some implementations, in addition to the individual tuple losses for tuples that are less than size N, the tuple loss is also based in part on an individual tuple loss for a tuple that is of size N. This can be viewed as a special case of an individual tuple loss, where n is equal to N, and is equivalent to cross-entropy loss. However, in many of those implementations the weight $p_N$ for the cross-entropy loss can be minimal based on, for example, very few users actually specifying all supported languages N as candidate languages for spoken utterances. Accordingly, while a total tuple loss can be a function of a cross-entropy loss, it is also a function of individual tuple losses that are for tuples that are smaller than N—and such tuple losses for tuples that are smaller than N can be collectively weighted significantly more heavily than the cross-entropy loss.

The above description is provided as an overview of some implementations of the present disclosure. Further description of those implementations, and other implementations, are described in more detail below.

In some implementations, a method implemented by one or more processors is set forth and includes generating a plurality of training examples. Generating each of the training examples is based on corresponding audio data that captures a corresponding human utterance, and a corresponding label that indicates a corresponding spoken language of the corresponding human utterance. The corresponding spoken language is one of N different languages to be recognized, where N is an integer that is greater than ten. Further, each training example includes corresponding training example input including corresponding features of the corresponding audio data, and corresponding training example output including a corresponding labeled probability metric for each of the N different languages to be recognized. The corresponding labeled probability metrics including, based on the corresponding label, a corresponding positive probability metric label that corresponds to the corresponding spoken language, and a corresponding negative probability metric label for all other of the corresponding labeled probability metrics. The method further includes training a language selection model based on the training examples. Training the language selection model includes processing the corresponding features of the corresponding training example inputs of the training examples using the language selection model to generate corresponding predicted probabilities for each of the N different languages, generating corresponding tuple losses based on the generated corresponding predicted probabilities and the corresponding labeled probability metrics, and updating weights of the language selection model using the generated corresponding tuple losses.

In some implementations, generating the corresponding tuple losses based on the generated predicated probabilities and the corresponding labeled probability metrics includes generating a given tuple loss of the tuple losses for a given training example of the training examples. In some implementations, generating the given tuple loss further includes determining, based on comparison of the corresponding labeled probability metric for the given training example and the corresponding predicted probabilities for the given training example, one or more individual tuple losses that are each for a corresponding tuple size that is less than N. The one or more individual tuple losses include at least a pair-wise loss that is for a corresponding tuple size of two. In some implementations, generating the given tuple loss further includes generating the given tuple loss based on the one or more individual tuple losses.

In some implementations, generating the given tuple includes using only the pair-wise loss as the given tuple loss. In other implementations, the one or more individual tuple losses further includes at least a tri-wise loss that is for a corresponding tuple size of three, and a four-wise loss that is for a corresponding tuple size of four. In some other implementations, generating the given tuple loss is based on a weighted combination of at least the pair-wise loss, the tri-wise loss, and the four-wise loss. In some other implementations, a weighting of the pair-wise loss in the weighted combination is based on a measured probability that indicates a percentage of users that specify only two candidate languages for speech processing.

In some implementations, updating the weights of the language selection model using the generated corresponding tuple losses includes backpropagating the tuple losses across the language selection model.

In some implementations, subsequent to training the language selection model, the method can further include receiving, via at least one microphone of a computing device, audio data that captures a current spoken utterance from a user, extracting one or more features of the current spoken utterance, processing, using the language selection model, the one or more features of the current spoken utterance to generate current predicted probabilities for each of the N different languages, selecting a current spoken language, of the N different languages, based on the current predicted probabilities, performing speech-to-text processing of the audio data based on the selected current spoken language. In some of those implementations, the method can further include selecting, from a plurality of candidate speech recognition models, a particular speech recognition model that corresponds to the selected current spoken language, and processing, using the selected speech recognition model, the features of the audio data to determine one or more words corresponding to the current spoken utterance. In some of those implementations, the method can further include generating content that is responsive to the one or more words, and providing the content for rendering by the computing device.

In some implementations, the method can further include, subsequent to training the language selection model, receiving, via at least one microphone of a computing device, current audio data that captures a current spoken utterance from the user. In some implementations, the method can further include identifying at least a first candidate spoken language and a second candidate spoken language, of the N different languages, based on the first candidate spoken language and the second candidate spoken language being designated as languages utilized at the computing device and/or utilized by a user of the computing device. In some implementations, the method can further include, based on identifying the first candidate spoken language and the second candidate spoken language, initiating first speech-to-text processing of the audio data using a first speech recognition model for the first candidate spoken language, and initiating second speech-to-text processing of the audio data using a second speech recognition model for the second candidate spoken language. In some implementations, the method can further include extracting one or more features of the current audio data. In some implementations, the method can further include, simultaneous with the first speech-to-text processing and the second speech-to-text processing, processing, using the trained language selection model, the one or more features of the audio data to generate current predicted probabilities for each of the N different languages, and determining, based on the current predicted probabilities, that the current spoken utterance is in the first candidate spoken language. In some implementations, the method can further include, based on determining that the current spoken utterance is in the first candidate spoken language, using output generated during the first speech-to-text processing in generating content responsive to the current spoken utterance.

In some of those implementations, determining, based on the current predicted probabilities, that the current spoken utterance is in the first candidate spoken language occurs prior to completion of the first speech-to-text processing and the second speech-to-text-processing, and further includes in response to determining that the current spoken utterance is in the first candidate spoken language, halting the second speech-to-text processing prior to completion of the second speech-to-text processing, while enabling the first speech-to-text processing to be completed.

In some of those implementations, determining that the current spoken utterance is in the first candidate spoken language is further based on a first confidence measure of the output generated during the first speech-to-text processing, the first confidence measure of the output generated during the first speech-to-text processing. In some of those implementations, determining that the current spoken utterance is in the first candidate spoken language is further based on a second confidence measure of second output generated during the second speech-to-text processing, the second confidence measure of the second output generated during the second speech-to-text processing.

In some implementations, the method can further include, subsequent to training the language selection model, receiving, via at least one microphone of a computing device, current audio data that captures a current spoken utterance, determining that the current spoken utterance is from a particular user, of a plurality of candidate users of the computing device, identifying a subset of the N different languages, based on the subset being designated as languages utilized by the particular user, and extracting one or more features of the current audio data. In some implementations, the method can further include, subsequent to training the language selection model, processing, using the trained language selection model, the one or more features of the current audio data to generate current predicted probabilities for each of the N different languages, and selecting a current spoken language, from the subset, based on the current predicted probabilities, wherein the selecting is from the subset responsive to identifying the subset based on the subset being designated as languages utilized by the particular user.

The above description is provided as an overview of some implementations of the present disclosure. Further description of those implementations, and other implementations, are described in more detail below.

In some implementations, a method implemented by one or more processors is set forth and includes receiving, via at least one microphone of a computing device, current audio data that captures a current spoken utterance from a user, extracting one or more features of the current audio data that captures the current spoken utterance, processing, using a language selection model trained using tuple losses, the one or more features of the current audio data to generate current predicted probabilities for each of N different languages, selecting a current spoken language, of the N different languages, based on the current predicted probabilities, and performing speech-to-text processing of the audio data based on the selected current spoken language.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
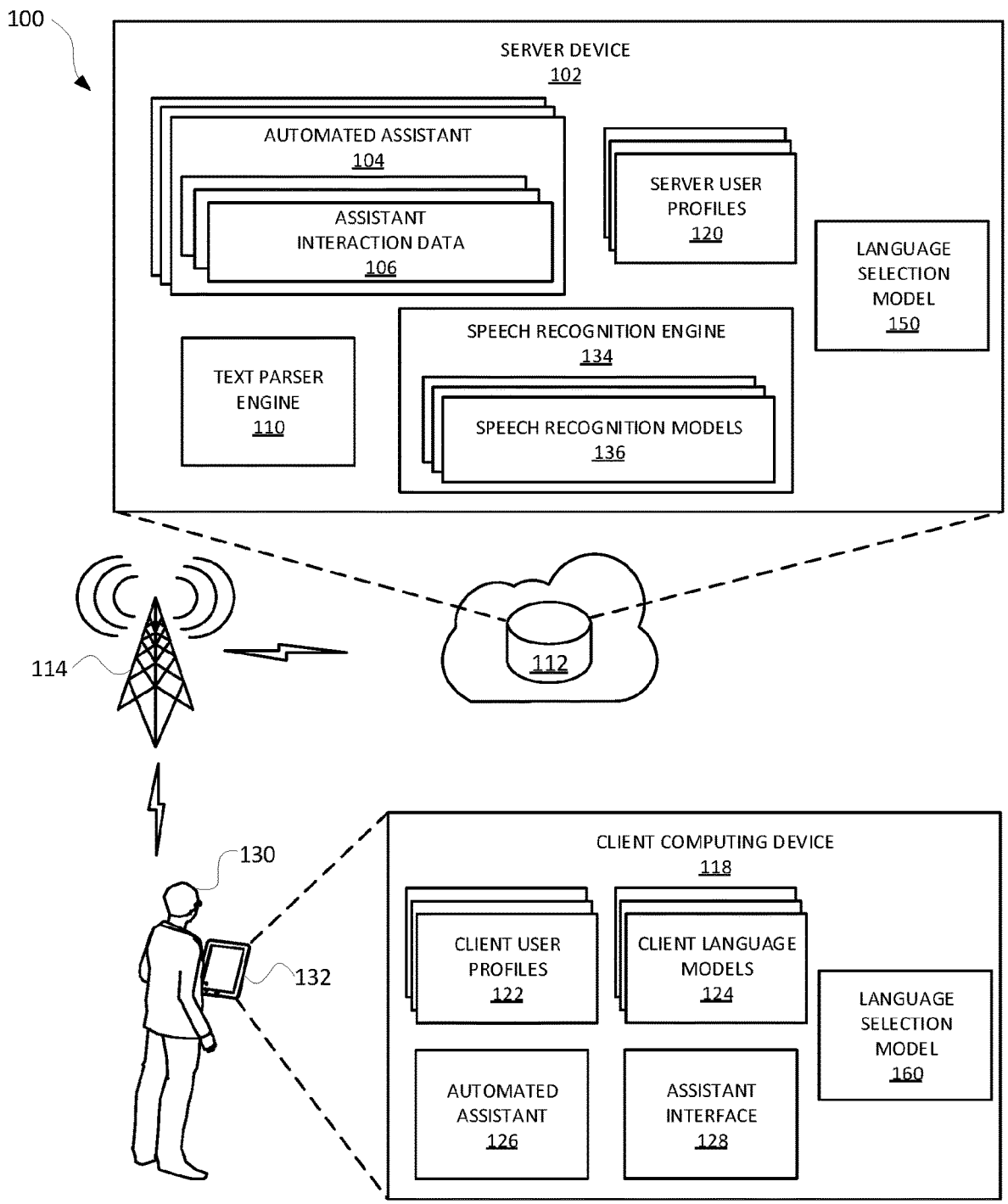
FIG. 1 illustrates an example system that utilizes a trained language selection model for selecting a language for an automated assistant to interact with a user, according to various implementations disclosed herein.

FIG. 1 illustrates an example system 100 that utilizes a trained language selection model 150 for selecting a language for an automated assistant 104 to interact with a user 130, according to various implementations disclosed herein. The automated assistant 104 can operate, in part via an automated assistant 126 that is provided at one or more client devices, such as client computing device 118 (e.g., a portable computing device 132), and in part via one or more remote computing device(s) 112, such as a server device 102 (e.g., which may form part of what is often referred to as "cloud infrastructure" or simply "the cloud"). When "automated assistant 104" is used herein, it may refer to one or both of 104 and 126. The user 130 can interact with the automated assistant 104 via an assistant interface 128 of the client computing device 118. The assistant interface 128 includes user interface input device(s) and user interface output device(s) for use by the automated assistant 126 in interfacing with the user 130.

The assistant interface 128 accepts user interface inputs of the user 130 that are directed to the automated assistant 104, and renders content responsive to the user interface inputs from the automated assistant 104 for presentation to the user 130. The assistant interface 128 can include one or more of a microphone, speaker, a display panel, a camera, a touch screen display, and/or any other user interface device(s) of the client computing device 118. The assistant interface 128 can also include a display, projector, a speaker, and/or any other user interface output device(s) of the client computing device 118 that can be used to render content from the automated assistant 104. A user can initialize the automated assistant 104 by providing a verbal, textual, or a graphical input to the assistant interface 128 to cause the automated assistant 104 to perform a function (e.g., provide data, control a peripheral device, access an agent, etc.). In some implementations, the client computing device 118 may include a display device, which can be a display panel that includes a touch interface for receiving touch inputs and/or gestures for allowing a user to control applications of the client computing device 118 via the touch interface. In some implementations, client computing device 118 can lack a display device, thereby providing an audible user interface output, without providing a graphical user interface output. Furthermore, the client computing device 118 can provide a user interface input device, such as a microphone(s), for receiving spoken natural language inputs from the user 130 (and from additional unillustrated users).

The client computing device 118 can be in communication with the remote computing device 112 over one or more networks 114, such as the Internet. The client computing device 118 can offload computational tasks to the remote computing device 112 in order to, for example, conserve computational resources at the client device 118 and/or leverage more robust resources available at the remote computing device 112. For instance, the remote computing device 112 can host the automated assistant 104, and the client computing device 118 can transmit inputs received at one or more assistant interfaces to the remote computing device 112. However, in some implementations, the automated assistant 104 can be hosted by the automated assistant 126 at the client computing device 118. In various implementations, all or less than all aspects of the automated assistant 104 can be implemented by the automated assistant 126 at the client computing device 118. In some of those implementations, aspects of the automated assistant 104 are implemented via the local automated assistant 126 of the client computing device 118 and interface with the remote computing device 112 that implements other aspects of the automated assistant 104.

The remote computing device 112 can optionally serve a plurality of users and their associated assistant applications via user profiles. In some implementations, the server device 102 may store server user profiles 120. In some other implementations, the client computing device 118 may store client user profiles 122. In implementations where all or less than all aspects of the automated assistant 104 are implemented via the local automated assistant 126 of the client computing device 118, the local automated assistant 126 can be an application that is separate from an operating system of the client device 118 (e.g., installed "on top" of the operating system)—or can alternatively be implemented directly by the operating system of the client device 118 (e.g., considered an application of, but integral with, the operating system).

In some implementations, the server device 102 may include a language selection model 150 and/or the client computing device 118 can include a language selection model 160. The language selection model 150 and the language selection model 160 can be the same model, or the language selection model 160 can optionally be a variant that is optimized for use on the more resource-constrained client computing device 118. Also, in various implementations the language selection model 150 can be implemented on the server device 102 without implementation of the language selection model 160 on the client computing device 118, or the language selection model 160 can be implemented on the client computing device 118, without implementation of the language selection model 150 on the server device 102.

As described herein, the automated assistant 104 can utilize the language selection model 150 in selecting a particular language corresponding to a received spoken human utterance and/or the automated assistant 126 can utilize the language selection model 160 in selecting a particular language corresponding to a received spoken human utterance. For example, the automated assistant 104 can process at least part of received audio data using the language selection model 150 to generate probabilities for each of N supported speech recognition languages. Further, the automated assistant 104 can utilize the generated probabilities to select one of those N supported languages as the particular language of a spoken utterance captured by the audio data. For instance, the automated assistant 104 can identify first and second languages as candidate languages for the spoken utterance, and select either the first language or the second language based at least in part of comparison of a first probability of the first language (from the N probabilities) and a second probability of the second language (from the N probabilities). It is noted that in various implementations the automated assistant 104 and/or the automated assistant 126 can also rely on one or more additional signal(s) in selecting the particular language, such as other signal(s) described herein.

In some implementations, the selected particular language is utilized to select only a corresponding one of the speech recognition models 136 for performing speech-to-text ("STT") processing of the audio data. In some implementations, STT processing may already be being performed by multiple of the speech recognition models 136 in parallel with the processing using the language selection model 150. For example, STT processing may be initialized for each of M candidate languages while processing is being performed using the language selection model 150. In some of those implementations, the selected particular language is nonetheless utilized to select output generated by only a corresponding one of the speech recognition models 136, and optionally to halt processing using the speech recognition model(s) 136 that do not correspond to the selected particular language. Example methods for training the language selection model 150 are described in more detail below with respect to FIGS. 2 and 3.

In some implementations, the remote computing device 112 can include a speech recognition engine 134 that can process audio data received at assistant interface 128 to determine text and/or other semantic representation(s) of a spoken utterance embodied in the audio data. The speech recognition engine 134 can utilize one or more speech recognition models 136, in determining text and/or other semantic representations of a spoken utterance embodied in audio data. As described herein, multiple speech recognition models 136 can be provided, and each speech recognition model can be for a corresponding language. For example, a first speech recognition model can be for English, a second speech recognition model can be for French, a third for Spanish, a fourth for Mandarin, a fifth for Japanese, and so on.

In some implementations, the speech recognition models 136 each include one or more machine learning models and/or statistical models for determining text (or other semantic representation) that corresponds to the spoken utterance embodied in audio data. In some implementations, the speech recognition engine 134 can utilize one of the speech recognition models 136 to determine phonemes, for a corresponding language, that are included in the audio data, and then generate text, for the corresponding language, based on the determined phonemes. In some implementations, a speech recognition model receives an audio recording of voice input, e.g., in the form of digital audio data, and converts the digital audio data into one or more text tokens (e.g., STT processing). The model or models used by such functionality generally model the relationship between an audio signal and phonetic units in a language, along with word sequences in the language. In some implementations, speech recognition models may be acoustic models, language models, pronunciation models, etc., as well as models combining functionality of one or more of such models. In some implementations, for example, speech recognition models may be implemented as finite state decoding graphs including a plurality of paths or pathways.

Further, as described herein, an additional language selection model 150 can be utilized in determining which of multiple speech recognition models 136 should be utilized in processing of audio data to generate semantic and/or textual representations, and/or in selecting which semantic and/or textual representations should be utilized. For example, in some of those implementations, the language selection model 150 is used to generate predicted probabilities that a spoken utterance corresponds to each of N different languages, where the multiple speech recognition models 136 correspond to each of the N different languages. Each predicted probability of the predicted probabilities for a given language may constitute a "guess" or "prediction" as to what language the user spoke.

When the user 130 is communicating with an automated assistant 126 at the client computing device 118, the user 130 can provide a spoken natural language input to an assistant interface 128 of the client computing device 118. The spoken natural language input can be converted into audio data, which can be processed by a client language model 124, such as an invocation phrase model for identifying whether the audio data embodies an invocation phrase for invoking the automated assistant 126. In some implementations, the invocation phrase model can be employed at the client computing device 118 to determine whether the user 130 is intending to invoke the automated assistant 104. When the user provides a natural language input to the assistant interface 128, and the natural language input includes an invocation phrase for invoking the automated assistant 104, the client computing device 118 can cause the automated assistant 104 at the server device 102 to receive the natural language input and/or subsequent natural language inputs from the user 130.

For instance, in response to determining that the user 130 is intending to invoke the automated assistant 104 at the client computing device 118, one or more communication channels can be established between the client computing device 118 and the server device 102. Thereafter, as the user continues to provide natural language inputs to the assistant interface 128, the natural language inputs will be converted into data that is then transmitted over the network 114 and processed by the server device 102. The natural language inputs may be processed by the server device 102 using the language selection model 150 to generate predicted probabilities that natural language inputs correspond to each of N different languages. Based on the predicted probabilities, one or more speech recognition models 136 may be selected as the appropriate model for each natural language input.

In some implementations, only one of the one or more speech recognition models 136 corresponding to the particular spoken language may be selected for STT processing of the natural language inputs. In some other implementations, STT processing of the natural language inputs may already be being performed by multiple of the one or more speech recognition models 136 corresponding to the particular spoken language and at least one additional language of the N different languages in parallel with the processing using the language selection model 150. For example, STT processing may be initialized for each of M candidate languages while processing is being performed using the language selection model 150. In some of those implementations, the selected particular language is nonetheless utilized to select output generated by only a corresponding one of speech recognition models 136, and optionally to halt processing using the speech recognition model(s) 136 that do not correspond to the selected particular language based on a ranking.

Figure 2:
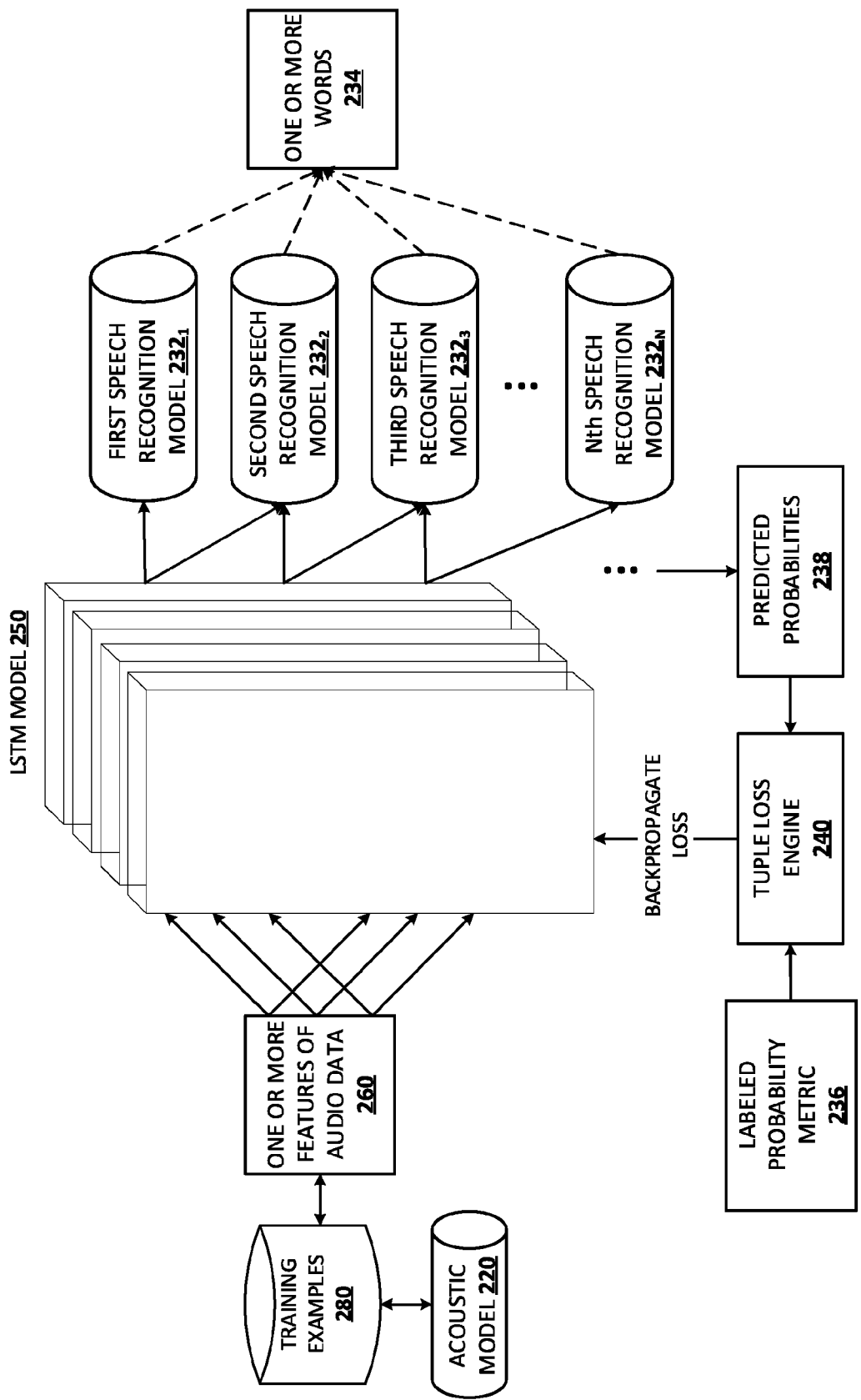
FIG. 2 illustrates one example of a language selection model, an example of training the language selection model utilizing tuple losses, and an example of utilizing the language selection model once trained.

FIG. 2 illustrates one example of a language selection model (LSTM model 250 in the example of FIG. 2), an example of training the language selection model 250 utilizing tuple losses, and an example of utilizing the language selection model 250 once trained. Training examples 280 may be stored in one or more databases. Each of the training examples 280 correspond to a spoken human utterance in a corresponding spoken language. Further, each of the training examples 280 may be processed by an acoustic model 220 to extract one or more features of audio data 260, represented as a feature sequence x, for each of the training examples 280 and a labeled probability metric 236, represented as a label y, where y∈{1, . . . , N}, and where N is a set of total possible languages, indicating a target language from the set of total possible languages, N. The one or more features of audio data 260 may be used as training example input for a language selection model, such as the language selection model 150, 160 of FIG. 1, which is represented as a long short-term memory ("LSTM") model 250 in FIG. 2 (although other network architectures can be utilized, as described herein). The labeled probability metric 236 indicates a positive probability metric for a language corresponding to a given training example, and indicates a negative probability metric for all other languages.

In some implementations, prior to processing the one or more features of audio data 260 using the LSTM model 250, the one or more features of the audio data may be run across a concatenation layer. The concatenation layer may allow a sliding window approach to be utilized at inference time, which is described in more detail herein (e.g., with reference to FIGS. 4-6). By using the concatenation layer, the output generated by the LSTM model 250 may be larger, but training is significantly faster and the LSTM model 250 is more robust as a result of using the concatenation layer. For example, the concatenation layer may concatenate neighboring segments of the audio data such that the number of inputs is halved.

In some implementations, after each layer of the LSTM model 250, a projection layer may be provided to reduce the size of the parameters for the LSTM model 250. By adding the projection layers and reducing the size of the parameters for the LSTM model 250, training of the LSTM model 250 and inference using the LSTM model 250 may significantly speed up training and inference without hurting performance. In some implementations, after the LSTM model 250, a temporal pooling layer may be provided to map the last output of the LSTM model 250 to a linear projection for each language for the set of total possible languages, N. By adding the pooling layer, the trained neural network perform with minimal latency and without requiring any context or padding.

With continuing reference to FIG. 2, in some implementations, z may be the N-dimensional output of the last layer of the language selection model, and z=f(x; w) may represent an unnormalized distribution of the feature sequence x over the N different languages, where w may represent the parameters of the language selection model. In some implementations, $z_k$ may be a predicted unnormalized probability of the $k^{th}$ language of the N different languages. The language selection model may be trained to output probabilities for each of the set of total possible languages, N, and a language can be selected from a subset, S, from the set of total possible languages, N. The subset, S, may be identified utilizing techniques described herein. For example, the subset S can be selected for received audio data based on the received audio data being associated with a user profile, and the user profile indicating the subset S as the languages spoken by a speaker associated with the user profile.

In some implementations, generating, by a tuple loss engine 240, a tuple loss for each training example includes comparing a labeled probability metric 236 for each training example to the predicted probabilities 238 for each training example, and determining a weighted combination on n tuples. The labeled probability metric 236 may be a vector of one or more values indicating which spoken language of the set of total spoken languages, N, should be recognized by the one or more features of the audio data 260 for a given training example. In some implementations, the labeled probability metric 236 may include a positive probability metric (e.g., a value of "1") for the spoken language captured by the one or more features of the audio data 260 for the given training example and a negative probability metric (e.g., a value of "0") for all other spoken languages from the set of total spoken languages, N. For example, assume during training that the language selection model has been utilized to generate predicted probabilities 238 of [0.7, 0.3, 0.0, . . . , 0.0] for audio data of a given training example, and the training example has a labeled probability metric 236 of [1, 0, 0, . . . , 0]. In such an example, a total tuple loss can be generated by comparing all of one or more n size tuples of the predicted probabilities 238 of [0.7, 0.3, 0.0, . . . , 0.0] (e.g., "0.7" and "0.3", "0.7" and "0.0", "0.3" and "0.0", etc.) and all of one or more n size tuples for the labeled probability metric 236 of [1, 0, 0, . . . , 0] (e.g., "1" and "0", "0" and "0", etc.).

In some implementations, the tuple loss is based at least in part on a pair-wise loss, although this not meant to be limiting. Pair-wise loss, as set forth herein (e.g., with respect to the Summary), may be represented by the following Equation 1:

$$L(y, z) = -E_{k \neq y}\left[\log \frac{\exp(z_y)}{\exp(z_y) + \exp(z_k)}\right] \quad \text{(Equation 1)}$$
$$= E_{k \neq y}[\log(\exp(z_y) + \exp(z_k))] - z_y$$

where $E_s$ denotes the expectation of a set s. A subset $S_y^n$ may be a collection of all the tuples that include the correct label y with n elements, where $1 < n \leq N$. The pair-wise loss of Equation 1 may be generalized as Equation 2 for determining a loss for producing a label from a subset of n labels:

$$L^n(y, z) = E_{S_y^n}\left[\log \Sigma_{k \in S_y^n} \exp(z_k)\right] - z_y \quad \text{(Equation 2)}$$

where $S_y^n$ is all the tuples in $S_y$ with size n. Accordingly, there are $$\|S^n\| = \binom{N-1}{n-1}$$

tuples in $S_y^n$.

Based on Equation 2, a total loss L(y, z) may be determined as a weighted sum of all tuple losses of different sizes for all $1 < n \leq N$ based on predicted probabilities for each language. The weighted sum of the all the tuple losses is defined by tuple loss function in Equation 3:

$$L(y,z) = E_{S^n - D}[L^n(y,z)] = \Sigma_{n=}^N p_n L^n(y,z) \quad \text{(Equation 3)}$$

where $p_n$ is a probability of tuples of size n and $L^n(y,z)$ is a loss associated with $p_n$. The probability of tuple of tuples of size n, $p_n$, corresponds to percentage of users that specify the pre-defined n languages in a user profile or an additional user profile. For example, if 90% of users specify two pre-defined languages, then $p_n$ may be 0.9. As another example, if 7% of users specify three pre-defined languages, then $p_n$ may be 0.07. By training the language selection model using tuple losses, the system may significantly speed up training and inference without hurting performance.

At inference, the predicted probabilities 238 may each be associated with a corresponding speech recognition model $232_1$-$232_N$ for each of the N different languages. A system using the LSTM model 250, can be configured to select between the speech recognition models $232_1$-$232_N$, based on the predicted probabilities, by processing the feature sequence x to determine one or more words that correspond to a current spoken utterance in a current spoken language from the set of total possible languages, N. For example, the system using the LSTM model 250 may receive a feature sequence x that corresponds to audio data of a current spoken utterance in the English language. Based on a user profile, it may be known that a user who provided the spoken human utterance is capable of speaking both English and Spanish. Based on the feature sequence x, the system may determine there is a 0.7 predicted probability the spoken human utterance is in English, and a 0.3 predicted probability the spoken human utterance is in Spanish.

Accordingly, the system using the LSTM model 250 may select a speech recognition model associated with English, such as the first speech recognition model $232_1$, based on the 0.7 predicted probability associated with English being greater than the 0.3 predicted probability associated with Spanish, over a speech recognition model associated with Spanish, such as the second speech recognition model $232_2$. If the user is capable of speaking two languages, then the two languages have a pair-wise relationship (e.g., a pair-wise relationship between English and Spanish, Spanish and German, German and French, etc.). In some implementations, once a speech recognition model is selected, STT processing of the audio data associated with the feature sequence x may be performed to determine one or more words 234 corresponding to the spoken human utterance. Further, the system may generate content responsive to the one or more words 236, and provide the content to a computing device for rendering of the content. In some implementations, as described herein, STT processing of the audio data can be performed in parallel with selecting a language for a spoken utterance using LSTM model 250, and the STT output corresponding to the selected language utilized in generating responsive content.

As another example, at inference, consider a first predicted probability distribution of [0.3, 0.4, 0.2, 0.1] and a second predicted probability distribution of [0.3, 0.25, 0.25, 0.2], where the first predicted probability corresponds to the a first language that is the "correct" language for a spoken utterance, and where each of the predicted probabilities in each predicted probability distribution correspond to each of N different languages. Further, the first predicted probability distribution may correspond to a predicted probability distribution associated with a language selection model trained using a cross-entropy loss function, and the second predicted probability distribution may correspond to a predicted probability distribution associated with a language selection model trained by a tuple loss engine 240 using a tuple loss function, such as the loss function of equation (3). Based on the first predicted probability distribution, the language selection model trained using the cross-entropy loss function may provide a probability indicating the spoken human utterance corresponds to a second spoken language as evidenced by the 0.4 probability. However, this selection of the second language is incorrect. Based on the second predicted probability distribution, the language selection model trained using the tuple loss function may provide a probability indicating the spoken human utterance corresponds to the first spoken language as evidenced by the 0.3 probability. Accordingly, by using the tuple loss function during training, the language selection model may provide more accurate results at inference, which reduces a number of inputs received by a user, conservers computational resources, and provides an overall better experience for a user.

Figure 3:
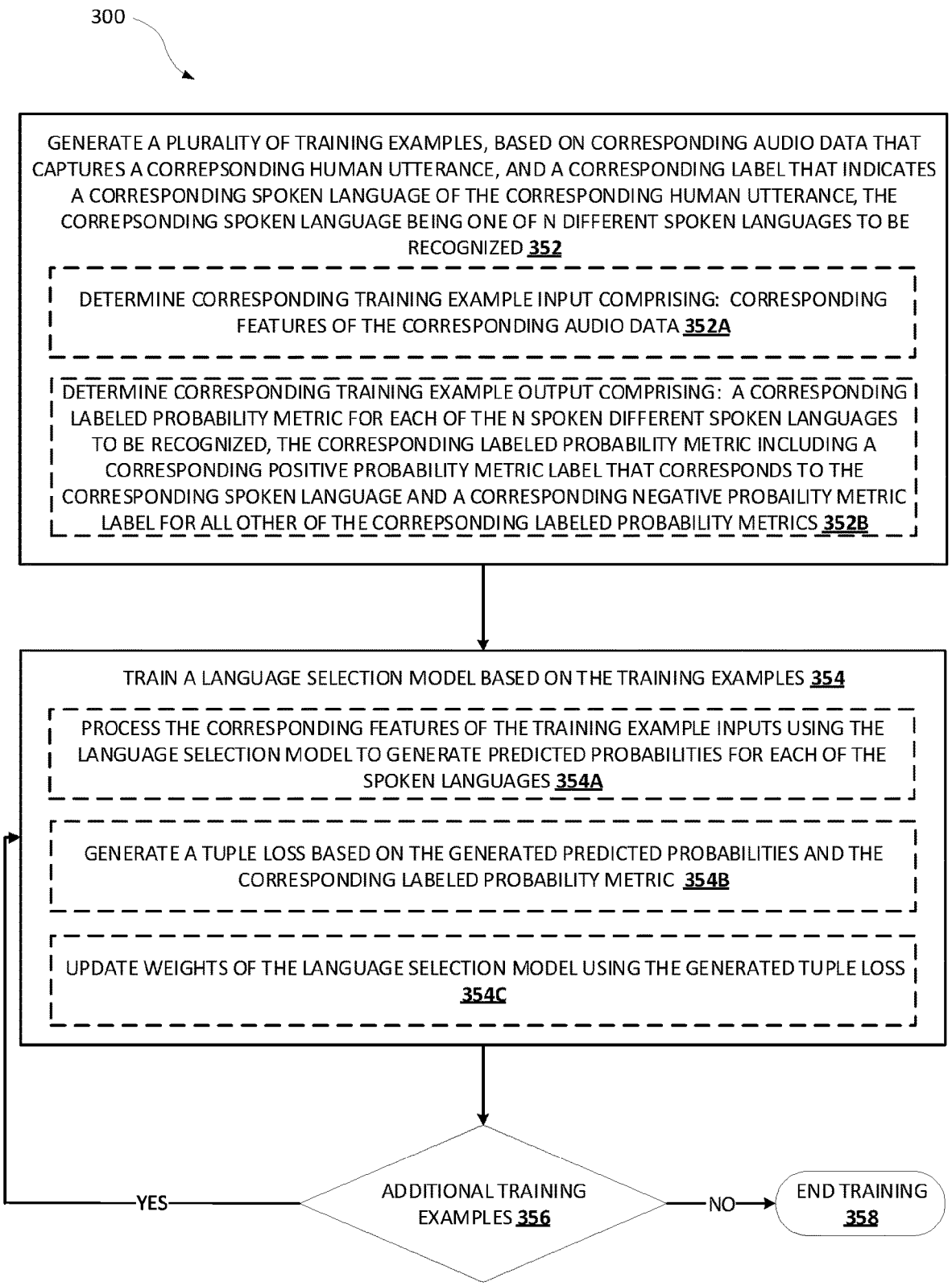
FIG. 3 is a flowchart illustrating an example method for training a language selection model according to implementations disclosed herein.

FIG. 3 is a flowchart illustrating an example method 300 for training a language selection model according to implementations disclosed herein. For convenience, the operations of the flow chart are described with reference to a system that performs the operations. This system may include various components of various computer systems, such as one or more components depicted in FIG. 1. Moreover, while operations of method 300 are shown in a particular order, this is not meant to be limiting. One or more operations may be reordered, omitted or added.

At block 352, the system generates a plurality of training examples based on corresponding audio data that captures a corresponding human utterance, and a corresponding label that indicates a corresponding spoken language of the corresponding human utterance. The corresponding spoken language of each training example is a corresponding one of N different languages to be recognized by the system. For example, the system may generate a training example based on a human utterance in the English language. The human utterance may be associated with audio data and a label indicating that the human utterance is in the English language. Further, block 352 may include one or more sub-blocks.

At sub-block 352A, the system determines corresponding training example input including corresponding features of the corresponding audio data. Continuing with the above example, the system may determine, from the corresponding audio data, one or more features of the audio data such as Mel-frequency cepstral coefficients (MFCCs), log-mel-filterbank features, and/or other features.

At sub-block 352B, the system determines corresponding training example output including a corresponding labeled probability metric for each of the N different languages to be recognized. Further, the corresponding labeled probability metric may include a corresponding positive probability metric label that corresponds to the corresponding spoken language of the corresponding training example input and a corresponding negative probability metric label for all other of the corresponding labeled probability metrics. Continuing with the above example, the system may determine, from the human utterance in the English language, a labeled probability metric, which may be represented as a vector, such that a value of "1" corresponds to a positive probability metric for the English language and a value of "0" corresponds to a negative probability metric for all other of the N different languages.

At block 354, the system trains a language selection model based on the training examples. Continuing with the above example, the system may receive a training example including corresponding training example input of the features of the audio data that captures the human utterance in the English language, and corresponding training example output of the labeled probability metric described herein (e.g., with respect to FIG. 2). Further, block 354 may include one or more sub-blocks.

At sub-block 354A, the system may process the corresponding features of the training example input using the language selection model to generate predicted probabilities for each of the spoken languages. Continuing with the above example, the system may process the features of the human utterance in English and to generate at least a first predicted probability of 0.7 indicating that it is likely that features of the human utterance correspond to the English language, and to generate at least a second predicted probability of 0.2 indicating that it is unlikely, but possible, that the features of the human utterance correspond to the Spanish language. Other probabilities can likewise be generated for other languages.

At sub-block 354B, the system generates a tuples loss based on the generated predicted probabilities and the corresponding labeled probability metric. Examples of generating the tuple loss are described herein and, as described, the tuple loss can optionally be a function of various individual tuple losses, such as pair-wise loss, tri-wise loss, etc.

At sub-block 354C, the system updates weights of the language selection model using the generated tuple loss. Continuing with the above example, the system can update the weights of the language selection model by backpropagating the tuple loss across the language selection model.

At block 356, the system determines whether to continue training the language selection model based on additional training examples. If, at block 356, the system determines to continue training the neural network based on additional training examples, then the system performs another iteration of block 354 (e.g., blocks 354A, 354B, and 354C). If, at block 356, the system determines not to continue training the language selection model based on additional training examples, then the system proceeds to block 358 and ends training. In some implementations, the system can determine not to continue training the language selection model based on the lack of additional training examples. The system can additionally or alternatively determine not to continue training the language selection model based on training having been performed for at least a threshold quantity of time, training having been performed for at least a threshold quantity of epochs, determining performance of the currently trained version of the language selection model satisfies one or more criteria, and/or other factor(s).

Figure 4:
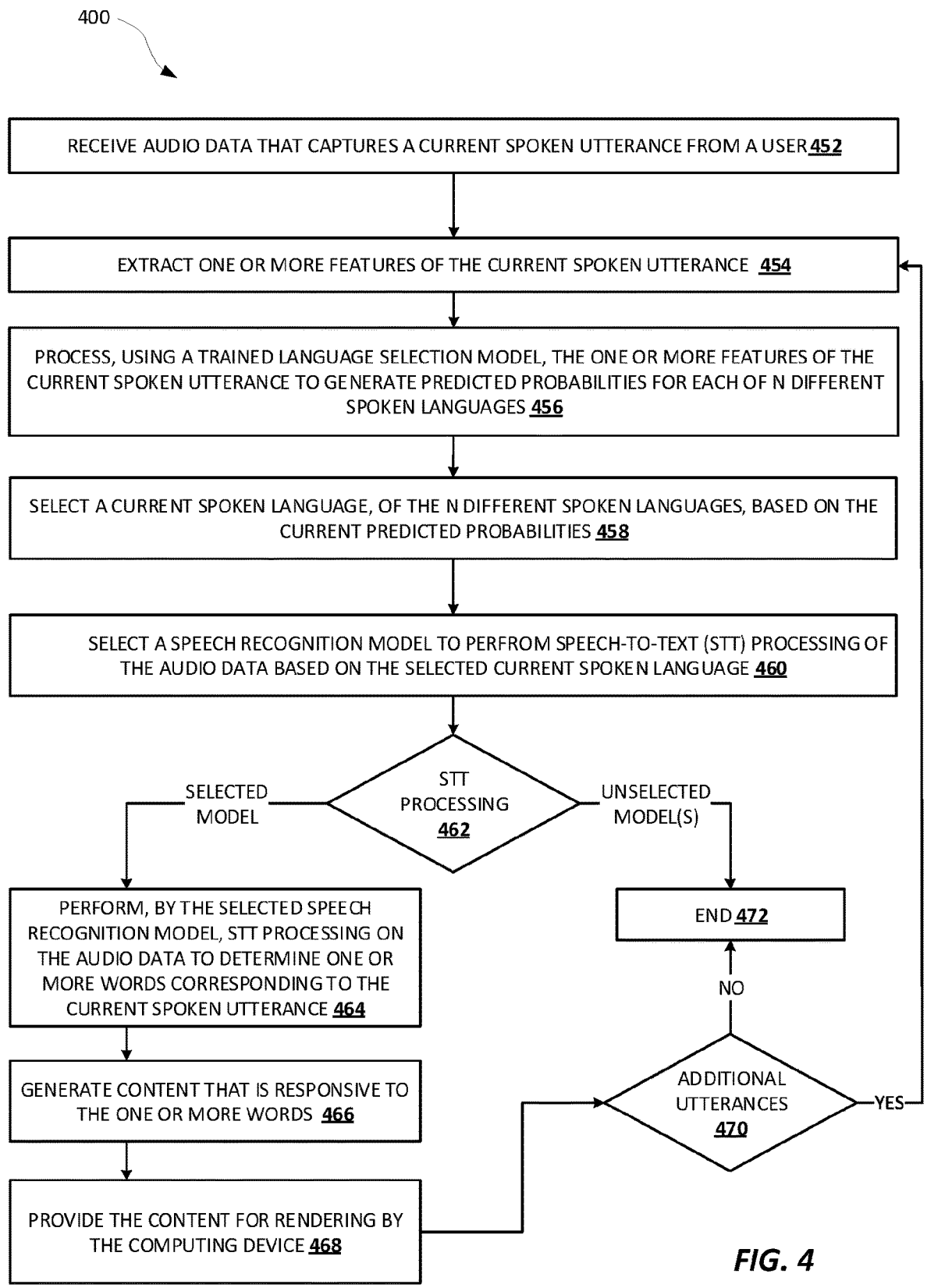
FIG. 4 is a flowchart illustrating an example method for using a trained language selection model, to select a speech recognition language, according to implementations disclosed herein.
Figure 5:
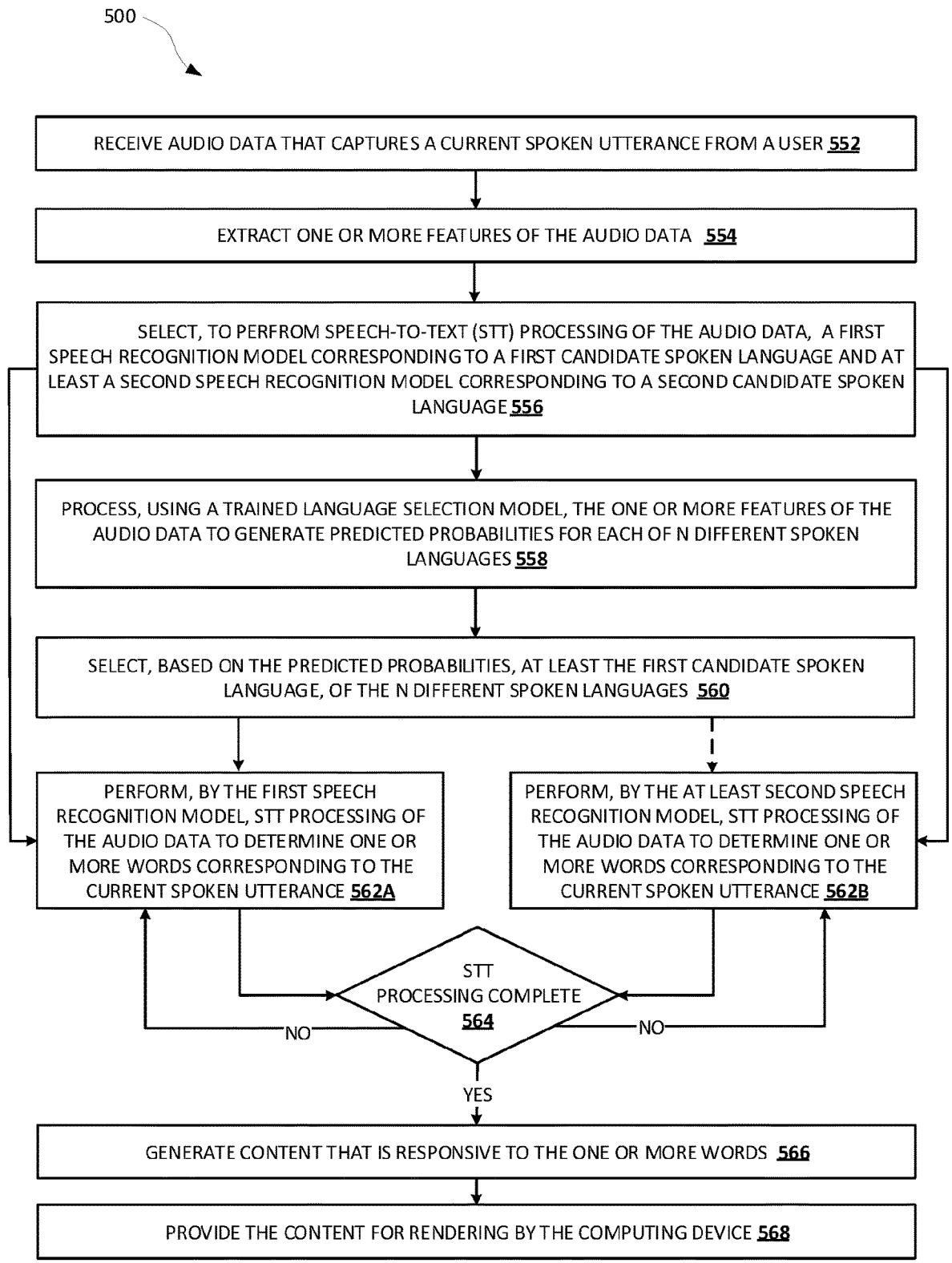
FIG. 5 is a flowchart illustrating another example method for using a trained language selection model, to select a speech recognition language, according to implementations disclosed herein.
Figure 6:
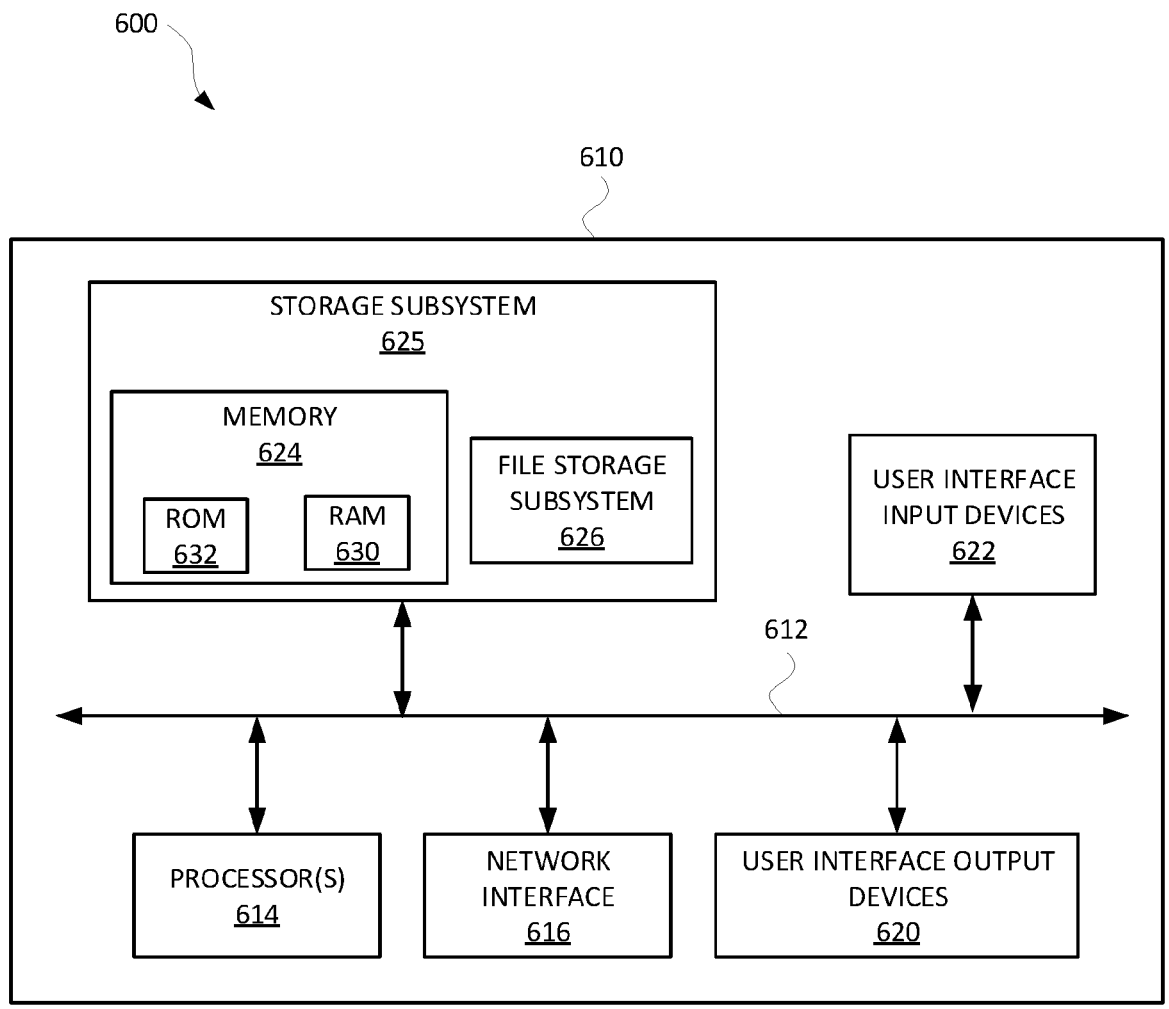
FIG. 6 is a block diagram of an example computer system according to implementations disclosed herein.

Referring now to FIGS. 4 and 6, methods for using a trained language selection model (e.g., trained using method 300 of FIG. 3) according to implementations disclosed herein are depicted. Prior to description of FIGS. 4 and 5, a brief overview of implementations of using a trained language selection model is provided. At inference, a subset of candidate languages, $S \in \{1, \ldots, N\}$ is identified, where N is a set of supported speech recognition languages, and where the subset S is the subset from which the system will select a given language. S is also referenced herein as M. The subset S can be determined for a given spoken utterance utilizing techniques such as those described herein (e.g., based on the subset being specified in a user profile associated with the given spoken utterance). A prediction of the given language can be represented as:

$$y^* = \arg\max_{k \in S} f(x; w) = \arg\max_{k \in S} z_k.$$

Further, at inference, the length of a spoken utterance received from a user may vary. The spoken utterance may be truncated into segments of a fixed duration, and portions of each segment may be overlapped and provided as input to the trained language selection model. The final output, or predicted probability, of the trained language selection model may be an average of the overlapping portions of the segments, and is represented in Equation 5:

$$y^* = \arg\max_{k \in S} E_t[f(x^t; w)] = \arg\max_{k \in S} E_t[z_k^t] \quad \text{(Equation 5)}$$

where $x^t$ is the input is an input segment for the $t^{th}$ sliding window and $z^t$ is the corresponding response form the trained language selection model. By using this sliding window approach, the trained language selection model may provide a more robust system for long spoken utterances. Further, this sliding window approach lends itself to several interesting use cases described herein (e.g., with respect to FIGS. 4 and 5). These use cases are non-limiting and are disclosed herein for exemplary purposes.

FIG. 4 is a flowchart illustrating an example method 400 for using a trained language selection model, to select a speech recognition language, according to implementations disclosed herein. For convenience, the operations of the flow chart are described with reference to a system that performs the operations. This system may include various components of various computer systems, such as one or more components depicted in FIG. 1. Moreover, while operations of method 400 are shown in a particular order, this is not meant to be limiting. One or more operations may be reordered, omitted or added.

At block 452, the system receives audio data that captures a current spoken utterance from a user. For example, the audio data can be captured via a microphone of a computing device, and can capture a spoken utterance from a user in the Spanish language.

At block 454, the system extracts one or more features of the current spoken utterance. Continuing with the above example, the system can extract features such as Mel-frequency cepstral coefficients (MFCCs), log-mel-filterbank features, and/or other features. Further, the system may, at block 454, optionally select a subset of the extracted features, where the subset of the extracted features includes features that are highly indicative of the language corresponding to the current spoken utterance.

At block 456, the system processes, using a trained language selection model, the one or more features of the current spoken utterance to generate predicted probabilities for each of N different languages. Continuing with the above example, the system may process the current spoken utterance to generate a first predicted probability of 0.8 that the current spoken utterance corresponds to the Spanish language, to generate a second predicted probability of 0.1 that the features of the current spoken utterance corresponds to the English language, and to generate corresponding probabilities for each of the remaining N different languages.

At block 458, the system selects a current spoken language, of the N different languages, based on the current predicted probabilities generated at block 456. Continuing with the above example, the system can select the Spanish language based on the first predicted probability of 0.8 indicating the current spoken utterance corresponds to the Spanish language, as opposed to selecting the English language based on the second predicted probability of 0.1, or selecting any other of the languages based on their probabilities. As described herein, in various implementations the system selects, at block 458, a current spoken language based on the predicted probabilities of M candidate languages associated with the current spoken utterance, where M is a subset of N. For example, an indication of the M candidate languages can be included in data transmitted with the audio data, or identified based on such data. Based on such indication, one of the M candidate languages can be selected based on comparing the generated probabilities for only the M candidate languages. In those implementations the highest probability language, of the M candidate languages, can be selected—even if there is a higher probability for another language that is one of the N languages, but that is not one of the M languages.

At block 460, the system selects a speech recognition model to perform speech-to-text ("STT") processing of the audio data based on the current spoken language selected at block 458. Continuing with the above example, the system selects a speech recognition model associated with the Spanish language.

At block 462, the system determines to perform STT processing using the selected speech recognition model, and to not perform STT processing using any of the non-selected speech recognition models. Accordingly, with respect to the non-selected speech recognition models, the system proceeds to block 472 where the processing ends for the other speech recognition models.

At block 464, the system performs, using the selected speech recognition model, STT processing on the audio data to determine one or more words corresponding to the current spoken utterance. Continuing with the above example, the system performs, using the Spanish language speech recognition model, STT processing to determine one or more words of the spoken utterance in the Spanish language.

At block 466, the system generates content that is responsive to the one or more words. Continuing with the above example, the system generates content responsive to the spoken utterance in the Spanish language. Content responsive to the spoken utterance may include a natural language response, a search result(s), content determined through interaction with a third party agents, content that causes launching of one or more applications installed on the computing device or a remote computing device, etc. The system can utilize a natural language understanding (NLU) engine and/or other engines in processing the one or more words to determine an intent of the one or more words, and optionally parameter(s) for the intent, and can generate the responsive content based on the intent and the parameters.

At block 468, the system provides the content for rendering by the computing device. Continuing with the above example, the system can provide the content for audible and/or visual presentation to the user via the computing device. In additional or alternative implementations, the one or more words generated at block 464 can be determined, at a variant of block 466, to correspond to a request to control a smart device. In those implementations, a variant of block 468 can include providing one or more commands, to the smart device directly or to a third party server that controls the smart device, where the commands cause the smart device to be controlled consistent with the request.

At block 470, the system determines whether the user has provided an additional utterance. If, at block 470, the system receives an additional utterance, then the system may return to block 452. If, at block 470, the system does not receive an additional utterance from the user, then the system may proceed block 472 and the processing ends.

FIG. 5 is a flowchart illustrating another example method 500 for using a trained language selection model, to select a speech recognition language, according to implementations disclosed herein. For convenience, the operations of the flow chart are described with reference to a system that performs the operations. This system may include various components of various computer systems, such as one or more components depicted in FIG. 1. Moreover, while operations of method 500 are shown in a particular order, this is not meant to be limiting. One or more operations may be reordered, omitted or added.

At block 552, the system receives audio data that captures a current spoken utterance from a user. For example, the audio data can be captured via a microphone of a computing device, and can capture a spoken utterance from a user in the Spanish language.

At block 554, the system extracts one or more features of the audio data. Continuing with the above example, the system may extract features such as one or more Mel-frequency cepstral coefficients (MFCCs), log-mel-filterbank features, and/or other features.

At block 556, the system selects, to perform STT processing of the audio data, a first speech recognition model corresponding to a first candidate spoken language and at least a second speech recognition model corresponding to a second candidate spoken language. The system may proceed to blocks 562A and 562B to begin performing of STT processing of the audio data. Continuing with the above example, the system may select a first speech recognition model associated with the Spanish language for STT processing of the audio data, and select a second speech recognition model associated with the English language for STT processing of the audio data. Further, the system may perform STT processing of the audio data using both the Spanish language model and the English language model. As described herein, in various implementations the system selects, at block 556, the first and second speech recognition models based on those models being for respective of M candidate languages associated with the current spoken utterance, where M is a subset of N. For example, English and Spanish speech recognition models can be selected and utilized for STT processing based on an indication that those are the two candidate languages for the received audio data.

At block 558, the system processes, using a trained language selection model, the one or more features of the audio data to generate predicted probabilities for each of N different languages. Continuing with the above example, the system may process the current spoken utterance to generate a first predicted probability of 0.4 that the current spoken utterance corresponds to the Spanish language, to generate a second predicted probability of 0.1 that the features of the current spoken utterance corresponds to the English language, and to generate corresponding probabilities for each of the remaining N different languages. As described herein, in various implementations block 558 is performed in parallel with at least part of the performance of blocks 562A and 562B. In other words, STT processing for each of the M candidate languages can be initialized while probabilities are being generated to enable selection of a language of the spoken utterance. The output from the STT processing corresponding to the selected language can then be utilized and, optionally, STT processing for other language(s) can be halted if such processing has not completed by the time the language of the spoken utterance has been selected. By performing such parallel processing, latency in generating text that corresponds to the spoken utterance can be reduced and, as a result, responsive action(s) can be taken, based on the spoken utterance, with reduced latency. Further, in implementations where STT processing for other (non-determined) language(s) is halted, unnecessary consumption of resources utilized in such processing can be prevented.

At block 560, the system selects, based on the predicted probabilities, a spoken language, of the N different languages. Continuing with the above example, the system can select the Spanish language as the spoken language utterance based on the first predicted probability of 0.4 being the highest probability amongst all probabilities for the M candidate languages.

At block 562A, the system performs, using the first speech recognition model corresponding to the first candidate spoken language, STT processing of the audio data to determine one or more words corresponding to the current spoken utterance. Continuing with the above example, the system performs, using the Spanish language model, STT processing of the audio data to determine one or more words in the Spanish language corresponding to the current spoken utterance.

At block 562B, the system the system performs, using the at least second speech recognition model corresponding to the second candidate spoken language, STT processing of the audio data to determine one or more words corresponding to the current spoken utterance. Continuing with the above example, the system performs, using the English language model, STT processing of the audio data to determine one or more words in the English language corresponding to the current spoken utterance.

As described above, in various implementations the STT processing of blocks 562A and 562B may be performed in parallel with the processing of blocks 558 and 560. For example, STT processing may be initialized for each of M candidate languages (e.g., the Spanish language and the English language in the continuing example) while processing is being performed using the language selection model. The spoken language selected at block 560 is utilized to select output generated by only one of blocks 562A and 562B (i.e., the output generated using the speech recognition model corresponding to the selected spoken language). Further, if STT processing utilizing the non-selected language has not yet concluded, the system can optionally halt such processing upon selecting the spoken language at block 560.

Continuing with the previous example, the system may perform STT processing of the audio data using both the Spanish language model and the English language model. As the system performs this STT processing, the system may process, using the language selection model, the audio data corresponding to generate probabilities for each of the N different languages. Based on the predicted probability for the Spanish language being 0.4 and the predicted probability for the English language being 0.2, the system can select the Spanish language and use output generated using the Spanish recognition model. The system can optionally halt STT processing using the English language model if it is not yet complete when the Spanish language is selected. In some implementations, halting can optionally only occur if the probability for the Spanish language satisfies threshold(s) (e.g., a threshold relative to the English language probability). For example, if the predicted probabilities are relatively close (e.g., 0.55 for the Spanish language and 0.45 for the English language), the system can complete STT processing using both the Spanish language model and the English language model, and use confidence metrics and/or other metrics from the STT processing to ensure that the selected Spanish language is actually the correct language.

At block 564, the system determines whether STT processing, using the model corresponding to the selected language, is complete. If, at block 564, the system determines that STT processing is not complete, the system continues the STT processing of block 562A and/or block 562B. If, at block 564, the system determines that STT processing is not complete, the system proceeds to block 566. At block 566, the system generates content that is responsive to the one or more words generated by the STT processing using the selected language. Continuing with the above example, the system generates content responsive to the spoken utterance in the Spanish language.

At block 568, the system provides the content for rendering by the computing device. Although method 500 is described with respect to performing STT processing utilizing two models (i.e., where M=2), it is noted that when M=3 STT processing can be performed in parallel for each of three corresponding models, when M=4 STT processing can be performed in parallel for each of four corresponding models, etc.

FIG. 6 is a block diagram of an example computer system 610. Computer system 610 typically includes at least one processor 614 which communicates with a number of peripheral devices via bus subsystem 612. These peripheral devices may include a storage subsystem 724, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, 400, and 500, and/or to implement one or more of server device 102, client computing device 118, portable computing device 132, and/or any other device or operation discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   generating a plurality of training examples, wherein generating each of the training examples is based on corresponding audio data that captures a corresponding human utterance, and a corresponding label that indicates a corresponding spoken language of the corresponding human utterance, the corresponding spoken language being one of N different languages to be recognized, wherein N is an integer that is greater than ten, and wherein each of the training examples comprises:
      corresponding training example input comprising: corresponding features of the corresponding audio data, and
      corresponding training example output comprising: a corresponding labeled probability metric for each of the N different languages to be recognized, wherein the corresponding labeled probability metrics include, based on the corresponding label, a corresponding positive probability metric label that corresponds to the corresponding spoken language, and a corresponding negative probability metric label for all other of the corresponding labeled probability metrics; and
   training a language selection model based on the training examples, training the language selection model comprising:
      processing the corresponding features of the corresponding training example inputs of the training examples using the language selection model to generate corresponding predicted probabilities for each of the N different languages,
      generating corresponding tuple losses based on the generated corresponding predicted probabilities and the corresponding labeled probability metrics, wherein generating the corresponding tuple losses based on the generated predicated probabilities and the corresponding labeled probability metrics comprises:
         generating a given tuple loss of the corresponding tuple losses for a given training example of the training examples, wherein generating the given tuple loss comprises:
            determining, based on comparison of the corresponding labeled probability metric for the given training example and the corresponding predicted probabilities for the given training example, one or more individual tuple losses that are each for a corresponding tuple size that is less than N, wherein the one or more individual tuple losses comprise at least a pair-wise loss that is for a corresponding tuple size of two; and
            generating the given tuple loss based on the one or more individual tuple losses, and
      updating weights of the language selection model using the generated corresponding tuple losses.

2. The method of claim 1, wherein generating the given tuple loss comprises using only the pair-wise loss as the given tuple loss.

3. The method of claim 1, wherein the one or more individual tuple losses further comprise at least a tri-wise loss that is for a corresponding tuple size of three, and a four-wise loss that is for a corresponding tuple size of four.

4. The method of claim 3, wherein generating the given tuple loss is based on a weighted combination of at least the pair-wise loss, the tri-wise loss, and the four-wise loss.

5. The method of claim 4, wherein a weighting of the pair-wise loss in the weighted combination is based on a measured probability that indicates a percentage of users that specify only two candidate languages for speech processing.

6. The method of claim 1, wherein updating the weights of the language selection model using the generated corresponding tuple losses comprises:
   backpropagating the tuple losses across the language selection model.

7. The method of claim 1, further comprising, subsequent to training the language selection model:
   receiving, via at least one microphone of a computing device, current audio data that captures a current spoken utterance from a user;
   extracting one or more features of the current audio data;
   processing, using the language selection model, the one or more features of the current audio data to generate current predicted probabilities for each of the N different languages;

selecting a current spoken language, of the N different languages, based on the current predicted probabilities; and performing speech-to-text processing of the current audio data based on the selected current spoken language.

8. The method of claim 7, wherein performing speech-to-text processing of the current audio data based on the selected current spoken language comprises:

selecting, from a plurality of candidate speech recognition models, a particular speech recognition model that corresponds to the selected current spoken language; and processing, using the selected speech recognition model, the features of the current audio data to determine one or more words corresponding to the current spoken utterance.

9. The method of claim 8, further comprising:

generating content that is responsive to the one or more words; and providing the content for rendering by the computing device.

10. The method of claim 1, further comprising, subsequent to training the language selection model:

receiving, via at least one microphone of a computing device, current audio data that captures a current spoken utterance from a user;

identifying at least a first candidate spoken language and a second candidate spoken language, of the N different languages, based on the first candidate spoken language and the second candidate spoken language being designated as languages utilized at the computing device and/or utilized by a user of the computing device;

based on identifying the first candidate spoken language and the second candidate spoken language:

initiating first speech-to-text processing of the current audio data using a first speech recognition model for the first candidate spoken language, and initiating second speech-to-text processing of the current audio data using a second speech recognition model for the second candidate spoken language;

extracting one or more features of the current audio data;

simultaneous with the first speech-to-text processing and the second speech-to-text processing:

processing, using the trained language selection model, the one or more features of the current audio data to generate current predicted probabilities for each of the N different languages, and determining, based on the current predicted probabilities, that the current spoken utterance is in the first candidate spoken language;

based on determining that the current spoken utterance is in the first candidate spoken language:

using output generated during the first speech-to-text processing in generating content responsive to the current spoken utterance.

11. The method of claim 10, wherein determining, based on the current predicted probabilities, that the current spoken utterance is in the first candidate spoken language occurs prior to completion of the first speech-to-text processing and the second speech-to-text-processing, and further comprising:

in response to determining that the current spoken utterance is in the first candidate spoken language:

halting the second speech-to-text processing prior to completion of the second speech-to-text processing, while enabling the first speech-to-text processing to be completed.

12. The method of claim 10, wherein determining that the current spoken utterance is in the first candidate spoken language is further based on:

a first confidence measure of the output generated during the first speech-to-text processing, the first confidence measure of the output generated during the first speech-to-text processing, and a second confidence measure of second output generated during the second speech-to-text processing, the second confidence measure of the second output generated during the second speech-to-text processing.

13. The method of claim 1, further comprising, subsequent to training the language selection model:

receiving, via at least one microphone of a computing device, current audio data that captures a current spoken utterance;

determining that the current spoken utterance is from a particular user, of a plurality of candidate users of the computing device;

identifying a subset of the N different languages, based on the subset being designated as languages utilized by the particular user;

extracting one or more features of the current audio data;

processing, using the trained language selection model, the one or more features of the current audio data to generate current predicted probabilities for each of the N different languages; and selecting a current spoken language, from the subset, based on the current predicted probabilities, wherein the selecting is from the subset responsive to identifying the subset based on the subset being designated as languages utilized by the particular user.

14. A method implemented by one or more processors, the method comprising:

generating a plurality of training examples, wherein generating each of the training examples is based on corresponding audio data that captures a corresponding human utterance, and a corresponding label that indicates a corresponding spoken language of the corresponding human utterance, the corresponding spoken language being one of N different languages to be recognized, wherein N is an integer that is greater than ten, and wherein each of the training examples comprises:

corresponding training example input comprising: corresponding features of the corresponding audio data, and corresponding training example output comprising: a corresponding labeled probability metric for each of the N different languages to be recognized, wherein the corresponding labeled probability metrics include, based on the corresponding label, a corresponding positive probability metric label that corresponds to the corresponding spoken language, and a corresponding negative probability metric label for all other of the corresponding labeled probability metrics;

training a language selection model based on the training examples, training the language selection model comprising:

processing the corresponding features of the corresponding training example inputs of the training examples using the language selection model to generate corresponding predicted probabilities for each of the N different languages, generating corresponding tuple losses based on the generated corresponding predicted probabilities and the corresponding labeled probability metrics, and updating weights of the language selection model using the generated corresponding tuple losses; and subsequent to training the language selection model:

receiving, via at least one microphone of a computing device, current audio data that captures a current spoken utterance from a user;

identifying at least a first candidate spoken language and a second candidate spoken language, of the N different languages, based on the first candidate spoken language and the second candidate spoken language being designated as languages utilized at the computing device and/or utilized by a user of the computing device;

based on identifying the first candidate spoken language and the second candidate spoken language:

initiating first speech-to-text processing of the current audio data using a first speech recognition model for the first candidate spoken language, and initiating second speech-to-text processing of the current audio data using a second speech recognition model for the second candidate spoken language;

extracting one or more features of the current audio data;

simultaneous with the first speech-to-text processing and the second speech-to-text processing:

processing, using the trained language selection model, the one or more features of the current audio data to generate current predicted probabilities for each of the N different languages, and determining, based on the current predicted probabilities, that the current spoken utterance is in the first candidate spoken language;

based on determining that the current spoken utterance is in the first candidate spoken language:

using output generated during the first speech-to-text processing in generating content responsive to the current spoken utterance.

15. The method of claim 14, wherein determining, based on the current predicted probabilities, that the current spoken utterance is in the first candidate spoken language occurs prior to completion of the first speech-to-text processing and the second speech-to-text-processing, and further comprising:

in response to determining that the current spoken utterance is in the first candidate spoken language:

halting the second speech-to-text processing prior to completion of the second speech-to-text processing, while enabling the first speech-to-text processing to be completed.

16. The method of claim 14, wherein determining that the current spoken utterance is in the first candidate spoken language is further based on:

a first confidence measure of the output generated during the first speech-to-text processing, the first confidence measure of the output generated during the first speech-to-text processing, and a second confidence measure of second output generated during the second speech-to-text processing, the second confidence measure of the second output generated during the second speech-to-text processing.

17. A system comprising:

at least one processor; and memory storing instructions that, when executed, cause the at least one processor to perform operations, the operations comprising:

generating a plurality of training examples, wherein generating each of the training examples is based on corresponding audio data that captures a corresponding human utterance, and a corresponding label that indicates a corresponding spoken language of the corresponding human utterance, the corresponding spoken language being one of N different languages to be recognized, wherein N is an integer that is greater than ten, and wherein each of the training examples comprises:

corresponding training example input comprising: corresponding features of the corresponding audio data, and corresponding training example output comprising: a corresponding labeled probability metric for each of the N different languages to be recognized, wherein the corresponding labeled probability metrics include, based on the corresponding label, a corresponding positive probability metric label that corresponds to the corresponding spoken language, and a corresponding negative probability metric label for all other of the corresponding labeled probability metrics; and training a language selection model based on the training examples, training the language selection model comprising:

processing the corresponding features of the corresponding training example inputs of the training examples using the language selection model to generate corresponding predicted probabilities for each of the N different languages, generating corresponding tuple losses based on the generated corresponding predicted probabilities and the corresponding labeled probability metrics, wherein generating the corresponding tuple losses based on the generated predicated probabilities and the corresponding labeled probability metrics comprises:

generating a given tuple loss of the corresponding tuple losses for a given training example of the training examples, wherein generating the given tuple loss comprises:

determining, based on comparison of the corresponding labeled probability metric for the given training example and the corresponding predicted probabilities for the given training example, one or more individual tuple losses that are each for a corresponding tuple size that is less than N, wherein the one or more individual tuple losses comprise at least a pair-wise loss that is for a corresponding tuple size of two; and generating the given tuple loss based on the one or more individual tuple losses, and updating weights of the language selection model using the generated corresponding tuple losses.

* * * * *